(12) United States Patent
Bennett et al.

(10) Patent No.: US 7,981,335 B2
(45) Date of Patent: Jul. 19, 2011

(54) METHOD AND PLANT FOR THE MANUFACTURE OF BUILDING PRODUCTS

(75) Inventors: Caroline Joyce Bennett, Sussex (GB); Peter Srostlik, Maintal (DE); Gregor Vogt, Bruchsal (DE)

(73) Assignee: Monier Technical Centre Limited (GB)

( * ) Notice: Subject to any disclaimer, the term of this patent is extended or adjusted under 35 U.S.C. 154(b) by 432 days.

(21) Appl. No.: 11/912,808

(22) PCT Filed: Apr. 26, 2006

(86) PCT No.: PCT/GB2006/001540
§ 371 (c)(1),
(2), (4) Date: May 9, 2008

(87) PCT Pub. No.: WO2006/114631
PCT Pub. Date: Nov. 2, 2006

(65) Prior Publication Data
US 2009/0174106 A1    Jul. 9, 2009

(30) Foreign Application Priority Data

Apr. 28, 2005    (GB) .................................. 0508652.5

(51) Int. Cl.
*C04B 41/81*    (2006.01)
(52) U.S. Cl. .................... 264/101; 264/102; 264/333
(58) Field of Classification Search .................. 264/101, 264/102, 333
See application file for complete search history.

(56) References Cited

U.S. PATENT DOCUMENTS 4,875,937 A * 10/1989 Viles .............................. 106/695
(Continued)

FOREIGN PATENT DOCUMENTS

GB    2 201 104    8/1988
(Continued)

OTHER PUBLICATIONS

International Search Report issued Aug. 2, 2006.

*Primary Examiner* — Joseph S Del Sole
*Assistant Examiner* — James Sanders
(74) *Attorney, Agent, or Firm* — Ostrolenk Faber LLP

(57) ABSTRACT

A plant and method for the manufacture of cementitious products, viz. cast concrete roof tiles (T), the plant comprising a mixing station (2) where the constituents of a cementitious composition, less an air entraining agent, are admixed under atmospheric pressure and further mixed under a partial vacuum of 200 to 340 mBar after the addition of an air entraining agent, the plant also comprising a molding station (4) where the tiles (T) are cast in a gang-mold (6) before being cured in a conventional autoclave for up to 10 hours at 45 degrees C. The cured concrete roof tiles (T) are de-molded after curing and conveyed to a surface preparation zone (12) where a primer coat of a water based epoxy and a surface coating of a water based emulsion paint are applied to at least an upper surface in use of the cast concrete roof tiles (T). The admixed cementitious composition has a Ford Cup flow of between 40 and 60 seconds and a slump test of between 180 and 220 mm. In an alternative method, instead of applying a primer coat, the upper surfaces, in use, of the roof tiles T are subjected to abrasion by grit-blasting to remove a thin layer from the upper surfaces thereby facilitating the subsequent application thereto of a surface coating.

14 Claims, 2 Drawing Sheets

U.S. PATENT DOCUMENTS

Figure 1:
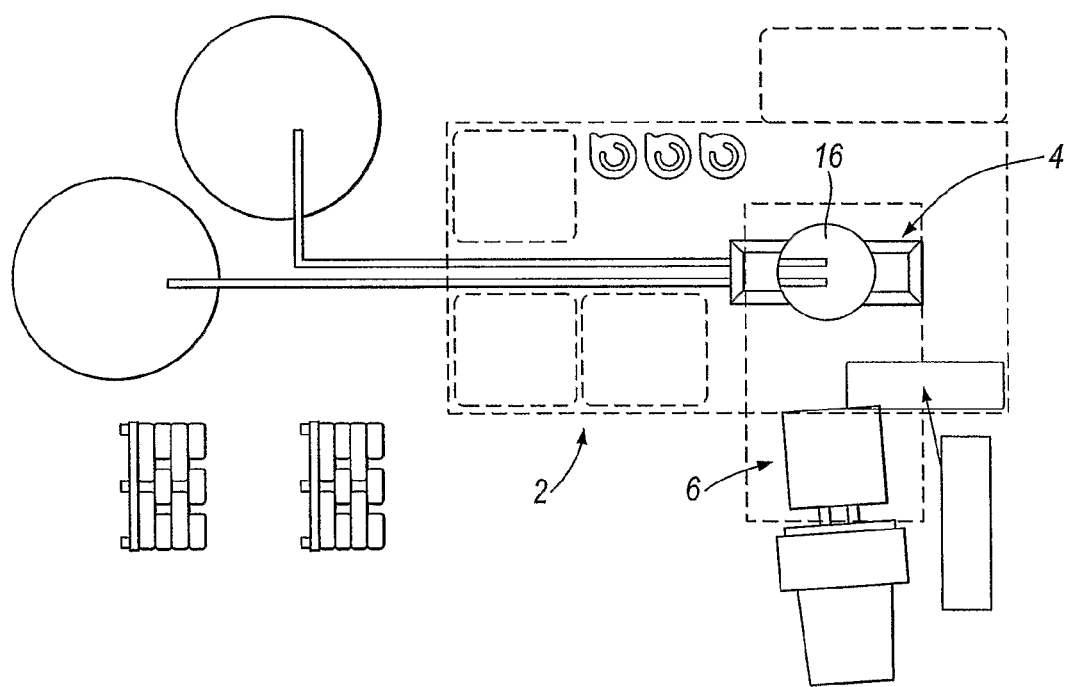

| | | | |
|---|---|---|---|
| 5,595,698 A * | 1/1997 | Nicholas et al. | 264/145 |
| 2001/0007711 A1 | 7/2001 | Schwartz et al. | |
| 2002/0009622 A1 * | 1/2002 | Goodson | 428/703 |
| 2004/0208079 A1 * | 10/2004 | Hein | 366/6 |
| 2006/0178463 A1 * | 8/2006 | Sacks | 524/444 |

FOREIGN PATENT DOCUMENTS

| | | |
|---|---|---|
| JP | 6-1679 | 1/1994 |
| JP | 8-67580 | 3/1996 |

\* cited by examiner

METHOD AND PLANT FOR THE MANUFACTURE OF BUILDING PRODUCTS

CROSS-REFERENCE TO RELATED APPLICATION

The present application is a 35 U.S.C. §371 national phase conversion of PCT/GB2006/001540 filed Apr. 26, 2006 and claims priority of GB 0508652.5 filed Apr. 28, 2005, both incorporated herein in their entirety.

This invention is concerned with a method for the manufacture of building products and an appropriate plant for effecting the method for the manufacture of the building products.

By building products where used herein, it is meant concrete roof tiles and concrete parts and fittings therefor.

A conventional practice for the manufacture of concrete roof tiles is described in GB 1352627, where the tiles are manufactured by an extrusion method, in which a stiff concrete mortar is fed from a hopper onto a series of tile pallets passing beneath the hopper where the mortar is formed on the pallets by extrusion between the pallets and an overlying roller and slipper. The surface finish of extruded roof tiles is very rough. Therefore, the surface of the tiles uppermost in use is coated with pigmented coating compositions in order to enhance the surface finish and the aesthetic appeal of the finished product.

A principal drawback of forming roof tiles by an extrusion method is that the shape and configuration of the upper surface of the extruded roof tile is dictated by the cross-section of the extrusion rollers and slippers that are conventionally used for their production. Thus, it is not possible to provide tiles with a headlock for increasing the rain-tightness thereof when the tiles are assembled on a roof. Also, tiles with exotic and aesthetic shapes cannot be produced with the known extrusion process. This presents a serious commercial disadvantage as the demand for roofing products with such shapes is strongly increasing in many countries.

In order to overcome or mitigate the disadvantages described above, casting processes were developed. Casting of concrete roof tiles facilitates the choice of shape and configuration for the upper surface in use of the concrete roof tiles made by this method.

Known casting processes can be distinguished in two types: those using re-usable moulds and those using lost moulds.

A casting process for roof tiles using re-usable moulds is described in EP 0437672, in which process a series of half moulds is formed into a gang mould so that a plurality of roof tiles can be cast at one time. Due to the surface smoothness of the half moulds the cast roof tiles receive a much smoother surface than extruded roof tiles. However, there are two serious disadvantages in such a process. Firstly, the half moulds need to be cleaned and provided with a release agent after each casting process in order to allow a proper shaping and de-moulding of cured roof tiles. Secondly, it is not possible to apply surface coatings to the surfaces of the cured roof tiles because any residual presence of the release agent will prevent a proper adhesion of the surface coating. Application of a surface coating is essential to resist the hazards of inclement weather conditions and for the supply of roof tiles with different surface colours and finishes.

WO 03/008166 describes a manufacturing process for concrete bodies which prevents the complicated handling and treatment of re-usable moulds by using lost moulds. The moulds are made from a material, e.g. moulding sand, which can be aggregated by compression and subsequently broken up. Moulds made from such a material have a rough surface and, consequently, the cast concrete bodies also have a rough surface necessitating the application of a surface coating thereto.

British patent publication GB 2 201 104 (MARSHALLS MONO LTD) discloses that in a continuous process, concrete paving flags are transported by a continuous conveyor through a first spray station, where a primer coat followed by a plurality of different colour paint coats are applied to the upper surface of the flags. At least one of the other coats is discontinuous, to provide a shaded effect. After passing through a first drying station, the flags enter a second spray station, where a layer of clear polymer is applied, and this is subsequently cured in a second drying station. Thus, the concrete paving flags are provided with a decorative coating comprising the shaded paint coats, and the clear polymer layer imparts a shiny appearance to the paving flags.

United States patent publication US 2001/007711 (BASF AG) describes a method of coating a concrete molding which comprises a) the application of at least one plastic, cement-bound mineral composition to an uncoated mineral molding wherein said plastic composition comprises at least one aqueous polymer dispersion and b) bringing about the setting of the plastic composition, wherein the aqueous polymer dispersion comprises: at least one polymer in the form of dispersed polymer particles with a glass transition temperature of from −20 to +80° C., the polymer containing not more than 2% by weight of copolymerized monoethylenically unsaturated monomers having an acid group.

Japanese patent publication JP 60 01679 (KUBOTA KK) seeks to improve the durability of a decorative layer in the case of application of decorative coating on a special roofing material made of cement. The method consists of a stage for subjecting the special roofing material molding obtained by an extrusion pressing method to primary aging, then preheating this special roofing material molding and subjecting the surface thereof to primer coating with a slurry consisting of silica sand and cement compound consisting of cellulose powder, cement, silica powder and silica sand as well as emulsion, pigments and water and drying the molding, then subjecting the surface to finish coating with an emulsion coating material then to aging in an autoclave. The durability of the decorative layer is improved by adding cellulose powder to the primer coating layer.

Japanese patent publication JP 60 67580 (KUBOTA KK) seeks to provide a cement product free from the release of a coating film even when used for a long period. The method for producing the cement product comprises kneading cement components comprising a cement, aggregate and water, shaping the kneaded product, coating the shaped product with a pigment-containing resin emulsion to form the first coating layer, subjecting the coated product to the first curing treatment, coating the cured product with a top coating comprising a pigment-containing resin emulsion to form the second coating layer, and subsequently subjecting the coated product to the second curing treatment.

Summarising, it is a fact that none of the roof tile manufacturers have managed to launch a cast roof tile in the market regardless of the increasing demand for different shapes of tiles and the existence of casting processes. This is because they are not able to provide roof tiles with surface coatings capable of resisting the hazards of inclement weather conditions.

During their work the Applicants have become aware that there are two reasons for the difficulty to coat the roof tiles. Firstly, because the surface of the tile has a weak layer consisting of fine particles not "glued" together with cement.

This weak layer is easily removed over a period of time so any coating applied directly to the surface will have poor adhesion. Secondly, because the surfaces of the roof tiles contain residua of the release agent, which serves to further weaken the tile surface layer that may prevent penetration of a primer coat.

It is therefore one of the objects of the invention to provide a plant and a method of manufacturing for roof tiles, and fittings therefor, which plant and method facilitates a high flexibility in the tile shaping and provides excellent surface qualities on the visible surfaces, in use, of the roof tiles.

The present invention thus provides a method for the manufacture of building products as hereinbefore defined comprising the steps of:

a) admixing a cementitious composition comprising: water, sand, pigment, reactive fine filler, cement and additives;
b) feeding the final cementitious composition into re-usable moulds to form green-state building products;
c) curing the green-state building products in a curing station;
d) de-moulding the cured building products,
e) conveying the cured building products through a surface preparation zone where upper surfaces, in use, of the products are prepared to facilitate subsequent application thereto of a surface coating, wherein the surface preparation of said upper surface includes the application of a primer coat thereto; and,
f) conveying the cured building products through a coating zone where the cured building products are provided with a surface coating on their prepared upper surfaces.

Conveniently, the method of admixing the cementitious composition includes the addition of an air entraining agent and/or a super-plasticiser.

Preferably, in admixing the cementitious composition, water, sand, pigment, reactive fine-filler e.g. fly ash, cement and the air entraining agent are mixed under atmospheric pressure; and a super-plasticiser is then added to the cementitious composition, which is thereafter mixed in a second step in a partial vacuum.

Preferably, the mixed cementitious composition has the properties of:
  a Ford Cup flow of between 35 and 90 seconds; and
  a slump test of between 160 and 220 mm.

Conveniently, the cementitious composition is mixed in the second step under a partial vacuum of between 240 and 320 mBar to produce the cementitious composition having a Ford Cup flow of 40 to 60 seconds.

In effecting the method provided by the present invention, the moulds are filled under pressure or by gravity and the filled moulds are conveyed to a curing zone where the green-state building products are subjected to heating at between 40 and 60 degrees centigrade for a period of between 8 and 12 hours.

Preferably, the moulds are prepared after the removal of the cured building products for their re-use by cleaning and applying a release agent.

The green state building products may be cured by conveying them to a separate curing station, wherein the temperature is increased sufficiently to effect curing. Alternatively, curing occurs in the moulding station and the cured building products are then conveyed to the surface preparation zone.

Conveniently, the surface preparation of the upper surfaces, in use, of the cured building products includes the application of a water based primer coat to the said upper surfaces.

In one convenient method provided by the present invention, after application of the water based primer coat to the cured building products, they are conveyed to a first curing zone in which the primer coat is heated to effect cross-linking of the primer coat and to reinforce the surfaces of the cured building product to provide receptive surfaces for a subsequently applied surface coating and, after application of the surface coating thereto, the cured building products are conveyed to a second curing zone in which the water based emulsion surface coatings are heated to reduce the tendency for the cured building products to be damaged during packaging.

Preferably, the building products are selectively warmed up in a first heating zone before the application of the water based primer coat to the upper surfaces, in use, of the building products and that primer coated building products are selectively warmed up in a second heating zone before the application thereto of a water based surface coating.

In a preferred method, provided by the present invention, the primer coat comprises a water-based epoxy.

In one embodiment of the invention, the upper surfaces, in use, of the cured building products are also subjected to abrasion in the surface preparation zone to further facilitate the subsequent application thereto of a surface coating. Conveniently, the abrasion of the said upper surfaces, in use, of the cured building products is effected by grit-blasting of said surfaces.

The present invention further provides a plant for the manufacture of building products as hereinbefore defined, the plant comprising:

a) a mixing station for admixing a cementitious composition comprising water, sand, pigment, reactive fine filler, cement and additives;
b) a moulding station where the admixed cementitious composition is fed into re-usable moulds to form green-state building products;
c) a curing station where the green state building products are cured;
d) a de-moulding station where the cured building products are de-moulded,
e) a surface preparation zone where the cured building products are conveyed by conveying means of the plant through the surface preparation zone where upper surfaces, in use, of the cured building products are prepared to facilitate subsequent application thereto of a surface coating, the surface preparation zone comprising a first coating zone for the application of a primer coat to said upper surface; and
f) a second coating zone where the cured building products are each provided with a surface coating on their prepared upper surfaces.

Conveniently, the surface preparation zone comprises an applicator for the application of a water based primer coat to the upper surfaces, in use, of the cured building products.

Preferably, the surface coating comprises a water based emulsion.

Conveniently, the second coating zone includes a curing zone for the application of heat to dry the surface coating applied to the prepared upper surfaces, in use, of the cured building products.

In one preferred embodiment of the invention the surface preparation zone comprises a first curing zone for heating and drying the primer coat to cause cross-linking thereof and to reinforce the surfaces of the building products to provide a receptive surface for a subsequently applied water based emulsion surface coating, the plant also comprising a second curing zone for heating and drying the surface coating to give a strong outer surface to the building products.

Preferably, after the addition of a super-plasticiser, the cementitious composition while in the mixing station is subjected to a partial vacuum of between 240 and 320 mBar to produce the cementitious composition having a Ford Cup flow of 40 to 60 seconds.

Conveniently, the cementitious composition is fed into the re-usable moulds under pressure or by gravity through a funnel device.

Preferably, when the plant is in use, the green-state building products are cured in the curing station for between 8 and 12 hours at a temperature of between 40° C. and 60° C.

A plurality of half moulds, arranged in a gang mould, are conveniently provided for the simultaneous moulding of an appropriate number of building products between each pair of adjacent half moulds of the gang mould and, when moulding the building products, the half moulds are preferably oriented on end within the gang mould.

Conveniently, means are provided at the de-moulding station for rotating the gang mould, for example through 90 degrees, to orient the half moulds and the cured building products in a substantially planar condition for de-moulding, and the cured building products are each de-moulded together with a next inline below half mould, the de-moulding station preferably comprising separation means for separating the cured building products from their respective half moulds.

The invention further comprises conveyor means for conveying the separated cured building products to the coating station and the separated half moulds to a cleaning station whereat the half moulds are prepared for a subsequent moulding operation.

Preferably, the surface preparation zone of the plant also comprises an abrasion means whereby the upper surfaces, in use, of the cured building products are subjected to abrasion to further facilitate the subsequent application thereto of a surface coating. Conveniently, the abrasion means is provided by grit-blasting means.

The present invention conveniently provides a building product manufactured by the method hereinbefore described when effected in the plant as described above.

Conveniently, the building product is a roof tile, or a fitting for use with a roof tile.

Figure 2:
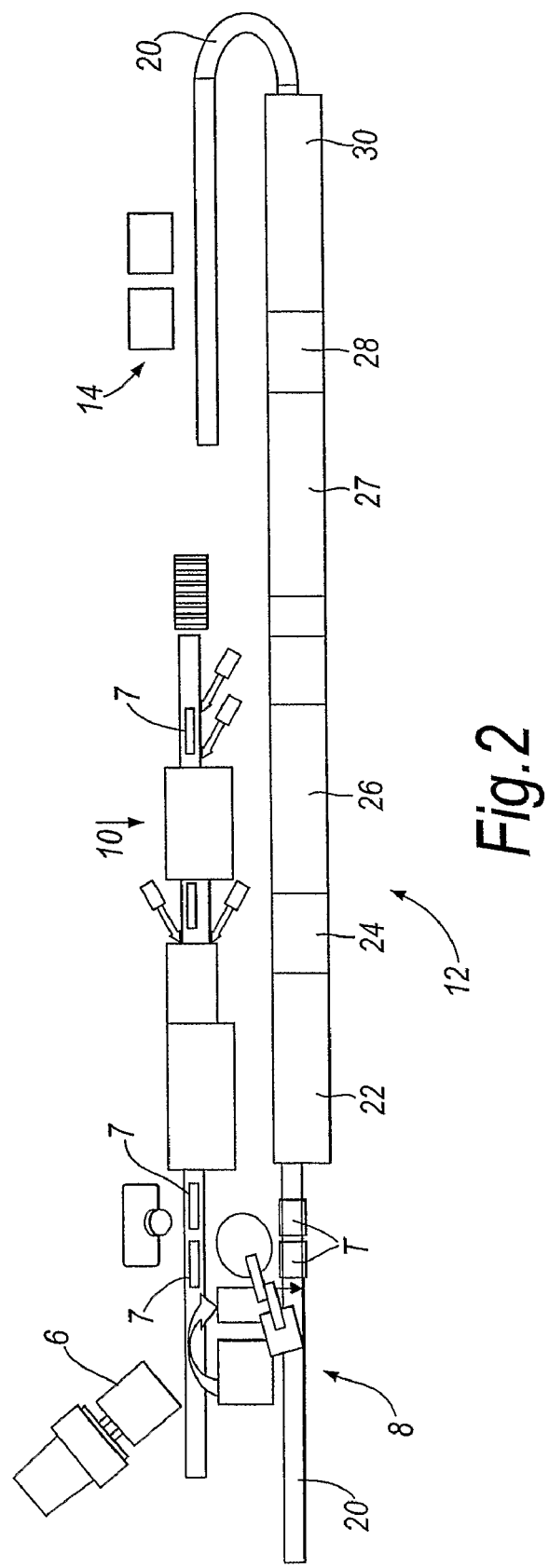

There now follows by way of example of the invention, a detailed description, which is to be read with reference to the accompanying drawings in which:

FIG. 1 is diagrammatic representation of mixing and moulding stations of the invention and, FIG. 2 is a diagrammatic representation of cured cementitious product and half-mould separation station and product preparation, coating and heat treatment zones of the invention.

The plant for the manufacture of building products, viz. concrete roof tiles T, generally comprises: a mixing station 2 whereat the constituents of a cementitious composition are admixed; a moulding station 4 whereat the cementitious composition is fed to gang-moulds 6 to be cast into roof tiles T; a curing zone, not shown, where the cast roof tiles T, in their respective gang-moulds 6 are cured; a de-moulding station 8, where the cast roof tiles T are removed from the gang-moulds 6; a cleaning station 10 for preparing gang-moulds 6 for successive casting operations; a surface preparation zone 12 whereat the cured roof tiles T are each subjected to a surface preparation operation and provided with surface coatings to at least their upper surface in use on a roof; and a stacking and packaging station 14 where the coated roof tiles T are stacked and packaged for storage and distribution.

The mixing station 2 is of conventional design and includes a mixer 16 wherein, when the plant is in use, the constituents of a cementitious composition are admixed as hereinafter described and subjected to mixing regimes including mixing in a partial vacuum.

The moulding station 4 has provision for locating a succession of gang-moulds 6, each of which comprises a series of half-moulds 7 for the simultaneous production of twenty-four concrete tiles T. The moulding station is provided with funnels, not shown, through which, when the moulding station is in use, a cementitious composition is fed simultaneously and under pressure into twenty-four mould cavities defined by the half-moulds 7. The curing zone is of conventional design and has provision for control of the temperature and humidity therein.

The de-moulding station 8 is provided with means, not shown, for separating the half moulds 7 from the cast concrete roof tiles T and feeding the half moulds 7, on edge, to a washing and cleaning station 10 whereat the half moulds are prepared for a subsequent moulding operation, see FIG. 2.

The de-moulding station 8 is also provided with means, illustrated diagrammatically in FIG. 2, for feeding the cast concrete roof tiles T seriatim to the surface preparation zone 12, whereat, when the plant is in use, the cast concrete roof tiles T are coated with a primer coat and a surface coating.

The surface preparation zone 12 comprises a conveyor 20, a heating zone 22 for selective warming cast concrete roof tiles passing there-through and a first coating zone 24 whereat, when the surface preparation zone 12 is in use, the primer coat is applied to the concrete roof tiles T. By "selective warming" in this context we mean that at least those surfaces of the concrete roofing tiles which are to receive the primer coating are heated.

The surface preparation zone 12 also comprises a first curing zone 26 for effecting cross-linking between the cementitious body of each roof tile T and the primer coat.

The surface preparation zone 12 also comprises a second heating zone 27 for selective warming the primer coated concrete roof tiles before application of the surface coating thereto. By "selective warming" in this context we mean that at least those surfaces of the primer coated concrete roofing tiles which are to receive the subsequent surface coating are heated.

The surface preparation zone 12 further comprises a second coating zone 28 whereat, when the surface preparation zone 12 is in use, a surface coating is applied to the primer coated concrete roof tiles T, the surface preparation zone 12 also being provided with a second curing zone 30 for effecting cross-linking between the primer coats and the surface coatings of the roof tiles T.

The conveyor 20 extends through the first heating zone 22, the first coating zone 24, the first curing zone 26, the second heating zone 27, the second coating zone 28 and the second curing zone 30 to convey the coated concrete roof tiles T to the stacking and packaging station 14.

In manufacturing concrete roof tiles T by a first method provided by the invention the constituents of a cementitious composition are admixed in the mixer 16 of the mixing station 2, the admixture comprising water, reactive fine-filler, e.g. fly ash, small aggregate, e.g. sand of 0.3 mm to 3 mm grain size, pigment, cement and an air entraining agent. These constituents are admixed at atmospheric pressure to form a precursor admixture after which a super-plasticiser is added to the precursor admixture, which is then mixed in a partial vacuum to produce a cementitious composition having a Ford Cup flow of 50 seconds and a slump test of 200 mm.

The benefit of using a partial vacuum during mixing of the constituents, and especially after admixing the super-plasticiser, is that the amount of entrained air is controlled to give a required consistency to the admixed cementitious composition.

The admixture of the cementitious composition is then fed under pressure to moulding station 4 and into the cavities formed between the half moulds 7 of the gang-mould 6 to form twenty-four concrete roof tiles T. At this time the gang-mould 6 is oriented so that the half moulds 7 are positioned on end and thus, the cavities formed by the half moulds 7 are also oriented so that the concrete roof tiles T are cast in a vertical plane.

From the moulding station 4, the gang-mould 6 is conveyed to the curing zone where the concrete roof tiles T are subjected to a curing regime of between 40 and 60 degrees C. for ten (10) hours.

When the concrete roof tiles T are fully cured in their respective gang-mould 6, the gang-mould 6 is conveyed to an orienting station, not shown, where the gang-mould 6 is rotated through 90 degrees to orient the half moulds 7 and the cast concrete roof tiles T in a substantially planar position.

This reorientation of the half moulds 7 and roof tiles T facilitates the ease with which the tiles T may be separated from the half moulds 7. Thereafter, the half moulds 7 are conveyed to the cleaning station 10 where they are cleaned and made ready for a subsequent moulding operation by applying a release agent to the moulding surfaces thereof.

At the same time, the cast concrete roof tiles T are placed on the conveyor 20 with their upper sides in use uppermost, the tiles T being conveyed seriatim (i) through the heating zone 22 where the tiles are selectively warmed prior to having a primer coat applied thereto, (ii) through the first coating zone 24 where a primer coat of a water based epoxy primer coat is applied to the at least the upper surface in use of the roof tile T, the primer coat being capable of cross-linking with the cement rich surface of the roof tile to provided a receptor surface for a top coat, (iii) through the first curing zone 26 where the primer coat is cured, (iv) through the heating zone 27 where the primer coated concrete roof tiles are selectively heated before application of a surface coating thereto, (v) through the second coating zone 28 where a surface coating of water based emulsion paint is applied onto the primer coat (vi) through the second curing zone 30 where the surface coating of water based emulsion paint is cross-linked with the water based epoxy primer coat, and (vii) to the stacking and packaging station 14 where the coated concrete roof tiles T are stacked and packaged for storage and eventual distribution.

Although it is described herein that the cementitious composition is fed into the mould cavities under pressure, in a modified method the cementitious compositions may be fed under gravity.

In a second method provided by the present invention for the manufacture of concrete roof tiles T, prior to applying the primer coat to the upper surfaces, in use, of the cured building products, viz. the roof tiles T, those surfaces are subjected to the abrasion action of grit-blasting means, not shown. The action of the grit-blasting means removes a thin, possibly release oil contaminated layer of the building products, thereby facilitating and improving the subsequent application of surface coatings thereto.

In effecting the second method provided by the present invention, the grit-blasting operation may be carried out at an air pressure of between 0.5 and 3.0 bar using alumina particles having an aspect ratio 75 to 150 microns.

The invention claimed is:
1. A method for the manufacture of a concrete roof tile comprising the steps of:

a) admixing a cementitious composition comprising: water, sand, pigment, reactive fine filler, cement and additives;
characterized in that in step a):
a1) the water, sand, pigment, reactive fine filler, cement and an air entraining agent are mixed under atmospheric pressure; and,
a2) a super-plasticiser is then added to the cementitious composition, which is thereafter mixed in a second step in a partial vacuum;
b) feeding the mixed cementitious composition into a reusable mold to form green-state roof tile;
c) curing the green-state roof tile in a curing station;
d) de-molding the cured roof tile,
e) conveying the cured roof tile through a surface preparation zone where the upper surface, in use, of the roof tile is prepared to facilitate subsequent application thereto of a surface coating;
f) conveying the cured roof tile through a coating zone where the cured building roof tile is provided with a surface coating on its prepared upper surface, and
g) the surface preparation of said upper surface includes the application of a primer coat thereto.

2. A method according to claim 1, wherein the cementitious composition is mixed in the second step under a partial vacuum of between 240 and 320 mBar.

3. A method according to claim 1, wherein the step of feeding the mixed cementitious composition into a re-usable mold is selected from filling the mold under pressure and filling the mold by gravity.

4. A method according to claim 1, wherein the filled mold is conveyed to a curing zone where the green-state roof tile is subjected to heating at between 40 and 60 degrees Centigrade for a period of between 8 and 12 hours.

5. A method according to claim 1, wherein the mold is prepared after the removal of the cured roof tile for its re-use by cleaning and applying a release agent.

6. A method according to claim 1, wherein the primer is a water-based primer.

7. A method according to claim 6, wherein after application of the water based primer coat to the cured roof tile, it is conveyed to a first curing zone in which the primer coat is heated to effect cross-linking of the primer coat and to reinforce the surface of the cured roof tile to provide a receptive surface for the subsequently applied surface coating.

8. A method according to claim 7, wherein the surface coating comprises a water-based emulsion.

9. A method according to claim 8, wherein the cured roof tile is conveyed to a second curing zone in which the water based emulsion surface coating is heated to reduce a tendency for the cured roof tile to be damaged during packaging.

10. A method according to claim 6, wherein the roof tile is selectively warmed up in a first heating zone before the application of the water based primer coat to said upper surfaces, and the primer coated roof tile is selectively warmed up in a second heating zone before the application thereto of the water based emulsion surface coating.

11. A method according to claim 1, wherein said upper surface is additionally subjected to abrasion.

12. A method according to claim 6, wherein said primer is a water-based epoxy.

13. A method according to claim 1, wherein said primer coat reinforces loose particles and penetrates release layer residue on the surface of the cured roof tile to provide a receptive surface for a subsequently applied surface coating.

14. A method according to claim 7, wherein said primer is a water-based epoxy.

* * * * *